United States Patent
Nakatsuka et al.

(10) Patent No.: US 12,172,135 B2
(45) Date of Patent: Dec. 24, 2024

(54) POROUS HOLLOW FIBER MEMBRANE

(71) Applicants: DAICEN MEMBRANE-SYSTEMS Ltd., Tokyo (JP); NIPRO CORPORATION, Osaka (JP)

(72) Inventors: Shuji Nakatsuka, Tokyo (JP); Takashi Sunohara, Osaka (JP); Toshinari Takahashi, Osaka (JP)

(73) Assignees: DAICEN MEMBRANE-SYSTEMS LTD., Tokyo (JP); NIPRO CORPORATION, Osaka (JP)

( * ) Notice: Subject to any disclaimer, the term of this patent is extended or adjusted under 35 U.S.C. 154(b) by 740 days.

(21) Appl. No.: 17/278,071

(22) PCT Filed: Sep. 18, 2019

(86) PCT No.: PCT/JP2019/036560
§ 371 (c)(1),
(2) Date: Mar. 19, 2021

(87) PCT Pub. No.: WO2020/059752
PCT Pub. Date: Mar. 26, 2020

(65) Prior Publication Data
US 2021/0346849 A1    Nov. 11, 2021

(30) Foreign Application Priority Data
Sep. 20, 2018    (JP) .................. 2018-175815

(51) Int. Cl.
*B01D 69/08*    (2006.01)
*B01D 63/04*    (2006.01)
(Continued)

(52) U.S. Cl.
CPC ........... *B01D 69/081* (2013.01); *B01D 63/04* (2013.01); *B01D 69/02* (2013.01);
(Continued)

(58) Field of Classification Search
CPC ...... B01D 69/081; B01D 63/04; B01D 69/02; B01D 71/68; B01D 2323/16;
(Continued)

(56) References Cited

U.S. PATENT DOCUMENTS

| | | | | |
|---|---|---|---|---|
| 4,938,778 A | * | 7/1990 | Ohyabu | ................. B01D 69/12 623/920 |
| 2004/0197557 A1 | * | 10/2004 | Eshraghi | ............. B01D 69/087 264/171.27 |
| 2017/0197182 A1 | * | 7/2017 | Holmberg | .............. B01D 71/56 |

FOREIGN PATENT DOCUMENTS

| | | |
|---|---|---|
| CN | 1579603 A | 2/2005 |
| EP | 2 636 442 A1 | 9/2013 |

(Continued)

OTHER PUBLICATIONS

Morita, JP2017100105 A, English machine translation (Year: 2017).*

(Continued)

*Primary Examiner* — Claire A Norris
(74) *Attorney, Agent, or Firm* — Birch, Stewart, Kolasch & Birch, LLP

(57) ABSTRACT

A hollow fiber porous membrane includes polyethersulfone or polysulfone. The hollow fiber porous membrane has an inner diameter from 300-600 μm, a thickness from 70-200 μm, a molecular weight cut-off of 10000 or lower, and a plurality of pores having a pore diameter from 0.1-0.5 μm throughout an outer surface; and a bulging rate of less than 5%. For 20 or more of the hollow fiber porous membranes, after a membrane thickness in a cross section of each one of the hollow fiber porous membranes in the width direction is measured at randomly selected 10 or more locations, an average membrane thickness is calculated based on 200 or more locations in total, and the bulging rate is calculated by a formula below: Bulging Rate (%)=(location numbers where the membrane thickness as measured exceeded 1.3

(Continued)

times the average membrane thickness)/(membrane thickness measurement numbers)×100.

9 Claims, 3 Drawing Sheets

(51) Int. Cl.
*B01D 69/02* (2006.01)
*B01D 69/14* (2006.01)
*B01D 71/68* (2006.01)
*C02F 1/44* (2023.01)
*C02F 101/30* (2006.01)
*C02F 103/02* (2006.01)

(52) U.S. Cl.
CPC ....... *B01D 69/0871* (2022.08); *B01D 69/141* (2013.01); *B01D 71/68* (2013.01); *C02F 1/44* (2013.01); *B01D 2323/16* (2013.01); *B01D 2325/023* (2013.01); *B01D 2325/04* (2013.01); *C02F 2101/305* (2013.01); *C02F 2103/026* (2013.01); *C02F 2303/04* (2013.01)

(58) Field of Classification Search
CPC .......... B01D 2325/023; B01D 2325/04; B01D 67/0088; B01D 2325/025; B01D 2325/20; B01D 2325/24; B01D 69/08; B01D 69/087; B01D 69/141; C02F 1/44; C02F 2101/305; C02F 2103/026; C02F 2303/04; D01D 5/24; D01D 5/247; D01D 6/76

USPC ................................................... 210/500.23
See application file for complete search history.

(56) References Cited

FOREIGN PATENT DOCUMENTS

| | | |
|---|---|---|
| JP | 7-155570 A | 6/1995 |
| JP | 2004-89800 A | 3/2004 |
| JP | 2004-121808 A | 4/2004 |
| JP | 2006-247444 A | 9/2006 |
| JP | 2017-100105 A | 6/2017 |
| WO | WO 2008/046779 A1 | 4/2008 |
| WO | 2 896 451 A1 | 7/2015 |

OTHER PUBLICATIONS

Oxford Dictionary Definition for Swell from 1683, p. 5, second row (Year: 1683).*

International Preliminary Report on Patentability and English translation of the Written Opinion of the International Searching Authority for International Application No. PCT/JP2019/036560, dated Apr. 1, 2021.

International Search Report for PCT/JP2019/036560 mailed on Dec. 3, 2019, with English translation.

Satoh et al., "Long-term efficacy of high-flux, hollow fiber filters for endotoxin removal from dialysis fluids", Journal Of Japanese Society for Dialysis Therapy, vol. 34, No. 11, 2001, pp. 1409-1413.

Extended European Search Report for European Application No. 19862019.7, dated May 27, 2022.

* cited by examiner

POROUS HOLLOW FIBER MEMBRANE

TECHNICAL FIELD

The present invention relates to a hollow fiber porous membrane and a hollow fiber membrane module having a hollow fiber membrane bundle, which is formed by bundling the hollow fiber porous membranes.

BACKGROUND ART

Medical purified water, such as water for dialysis and water for injection, needs to be free of endotoxin.

JP 2017-100105 A describes an invention of an external pressure hollow fiber membrane module that can increase the filtration flow rate while preventing breakage of the hollow fiber membrane and a method of manufacturing the external pressure hollow fiber membrane module.

JP 2004-121608 A describes an invention of a hollow fiber membrane reducing the pump load of a dialyzer and supplying a highly purified dialysate by increasing water permeation performance and endotoxin removal performance, and a method of manufacturing the hollow fiber membrane.

JP 2006-247444 A describes a hollow fiber membrane module having a case housing and a hollow fiber membrane bundle housed in the case housing, in which the inner wall of the case housing and at least one end of the hollow fiber membrane bundle are adhesively integrated with an adhesive, and an amount of a wetting agent at the end of the hollow fiber membrane bundle is 0.6 g or less per g of the membrane.

Shigeru Sato and 10 other authors describe in "Changes in Efficacy of Endotoxin Removal Filters due to Long-term Use", J. Jpn. Soc. Dial. Ther., 34(11), 1409-1413, 2001 that the endotoxin removal performance in long-term use depends on differences in the molecular weight cut-off and microstructure of hollow fiber membranes.

SUMMARY OF INVENTION

An object of the present invention is to provide in one aspect a highly reliable hollow fiber porous membrane with a low risk of leaking. Another object of the present invention is to provide in another aspect a hollow fiber membrane module such as a medical hollow fiber membrane module produced using the subject hollow fiber membrane.

In one embodiment, the present invention provides a hollow fiber porous membrane including polyethersulfone or polysulfone, wherein
- the hollow fiber porous membrane has an inner diameter from 300 to 600 μm and a thickness from 70 to 200 μm;
- the hollow fiber porous membrane has a molecular weight cut-off of 10000 or lower;
- the hollow fiber porous membrane has a plurality of pores having a pore diameter from 0.1 to 0.5 μm throughout an outer surface of the hollow fiber porous membrane; and
- the hollow fiber porous membrane has a bulging rate of less than 5%, the bulging rate being defined below:
- Bulging Rate (%): for 20 or more of the hollow fiber porous membranes, after a membrane thickness in a cross section of each one of the hollow fiber porous membranes in a width direction is measured at randomly selected 10 or more locations, an average membrane thickness is calculated based on 200 or more locations in total, and the bulging rate is calculated by a formula below: Bulging Rate (%)=(location numbers where the membrane thickness as measured exceeded 1.3 times the average membrane thickness)/(membrane thickness measurement numbers)×100

In another embodiment, the present invention also provides a hollow fiber membrane module having a case housing and a hollow fiber membrane bundle housed in the case housing, the hollow fiber membrane bundle being formed by bundling the hollow fiber porous membranes. In one embodiment, this hollow fiber membrane module may be for medical use.

The hollow fiber porous membrane according to an example of the present invention has a low risk of leaking and is highly reliable. Thus, the hollow fiber porous membrane according to an example of the present invention and the hollow fiber membrane module produced using the hollow fiber membrane may be used for medical purpose, for example, for an endotoxin capture filter to capture endotoxin contained in raw water to be treated.

DESCRIPTION OF EMBODIMENTS

Hollow Fiber Porous Membrane

Figure 1:
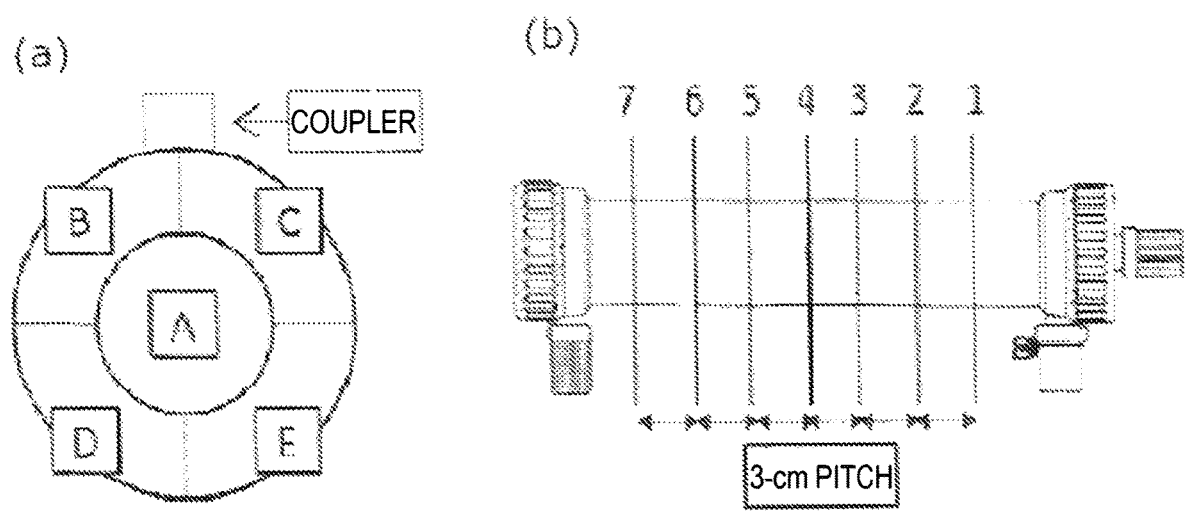
FIG. 1 is a diagram ((a) front view, (b) side view) of a hollow fiber membrane module in a state where hollow fiber porous membranes according to one embodiment are housed in a case housing, illustrating a location where hollow fiber porous membranes are extracted and locations where hollow fiber porous membranes were cut out.

A hollow fiber porous membrane according to an embodiment of the present invention may contain polyethersulfone or polysulfone as a component. In some examples, 80 mass % or greater of components constituting the hollow fiber membrane may be polyethersulfone or polysulfone, and in some other examples, 100 mass % may be polyethersulfone or polysulfone.

The rest of polymer components when less than 80 mass % to 100 mass % of components constituting the hollow fiber membrane is polyethersulfone or polysulfone may be selected from polyacrylonitrile, polymethyl methacrylate, and the like. In some examples, a hollow fiber porous membrane according to an embodiment of the present invention does not contain polyvinylpyrrolidone.

The inner diameter of the hollow fiber porous membrane according to an embodiment of the present invention may be from 300 to 600 μm, in some examples from 400 to 570 μm, and in some other examples from 450 to 550 μm. The thickness of the hollow fiber porous membrane according to an embodiment of the present invention may be from 70 to 200 μm, in some examples from 100 to 180 μm, and in some other examples from 120 to 170 μm.

The hollow fiber porous membrane with an inner diameter of smaller than 300 μm would increase the pressure loss as a hollow fiber membrane module and cause difficulty in efficient operation. In addition, the hollow fiber porous membrane with an inner diameter of greater than 600 μm would reduce the membrane area per volume of a hollow fiber membrane module and excessively reduce the permeability flow. The hollow fiber porous membrane with a thickness of less than 70 μm would excessively reduce the membrane strength, and the hollow fiber porous membrane with a thickness of greater than 200 μm would excessively reduce the permeability flow. In one example of the present invention, the inner diameter, membrane thickness of the hollow fiber porous membrane, and the membrane thickness of each layer described below can be determined by photographing a cross-sectional structure in the width direction of the hollow fiber porous membrane with a scanning electron microscope (SEM).

According to one example of the present invention, a plurality of pores with a pore diameter from 0.1 to 0.5 μm may be present throughout the outer surface of the hollow fiber porous membrane. A plurality of pores having a pore diameter from 0.1 to 0.5 μm being present throughout the outer surface may mean that when any location on the outer surface of the hollow fiber porous membrane is observed with a scanning electron microscopy (SEM), two or more, in some examples three or more, and in some other examples five or more, and in some examples 15 or less and in some other examples 10 or less pores each having a pore diameter from 0.1 to 0.5 μm are observed per area of 2 μm$^2$ of the outer surface in any location on the outer surface.

The pore diameter may be measured as Feret's constant direction tangential diameter. With a pore diameter being smaller and the number of pores being less on the outer surface of the hollow fiber porous membrane than the predetermined conditions of the present application, a sealant, such as a polyurethane adhesive, would be less likely to penetrate the hollow fiber porous membrane in producing a hollow fiber porous membrane module. This would increase the possibility of leaking and lose the reliability. In addition, a larger pore diameter and the greater number of pores on the outer surface of the hollow fiber porous membrane than the predetermined conditions of the present application would impair the strength of the outer surface of the hollow fiber porous membrane, and this would be more likely to deteriorate the hollow fiber porous membrane.

The molecular weight cut-off of the hollow fiber porous membrane according to an embodiment of the present invention may be 10000 or lower, in some examples 8000 or lower, and in some other examples 7000 or lower, and in some examples 1000 or higher and in some other examples 3000 or higher. With a molecular weight cut-off of higher than 10000, effective removal of endotoxin and the like would be difficult.

The molecular weight cut-off is a nominal value representing the separation performance of the membrane and is expressed as the molecular weight of a substance up to 90% of which can be blocked by the membrane. In an embodiment of the present invention, the molecular weight cut-off of the hollow fiber porous membrane can dissolve various proteins or peptides with a known molecular weight to give a concentration of 250 mg/L in a buffer solution containing sodium phosphate (0.05 M) and sodium chloride (0.1 M), adjust a pH to 5 to 7, pass this solution inside the hollow fiber porous membrane to filter this solution at an intermembrane pressure of 0.1 MPa, and determine the concentration of the proteins or peptides in the permeate after 30 minutes of filtration using an absorption spectrometer (a wavelength of 277 nm) to determine the blocking rate of various proteins or peptides, and adopt the molecular weight at which the blocking rate is 90% as the molecular weight cut-off. Examples of the proteins or peptides used in the molecular weight cut-off measurement include ovalbumin (molecular weight 46000), trypsin inhibitor (molecular weight 28000), myoglobin (molecular weight 16800), cytochrome C (molecular weight 12500), and insulin (molecular weight 5800).

The hollow fiber porous membrane according to an embodiment of the present invention may have a molecular weight cut-off of 10000 or lower. The pore diameter on an inner surface of the hollow fiber porous membrane may have a void of substantially less than 0.01 μm, but the void is too small to observe with an SEM even under a condition of a magnification of 10000 times.

The hollow fiber porous membrane according to an embodiment of the present invention may include a five-layer structure of an inner surface dense layer, an inner void layer, an interlayer, an outer void layer, and an outer surface dense layer sequentially from inside to outside in the cross section in the width direction.

In an embodiment of the present invention, the inner surface dense layer may be a layer having no void with a pore diameter of 5 μm or greater. In an embodiment of the present invention, the void of 5 μm or greater may mean that the maximum diameter is 5 μm or greater and, for example, the major axis is 5 μm or greater in a void with an elliptic cross section.

The thickness of the inner surface dense layer may be a thickness of $\frac{1}{100}$ to $\frac{1}{10}$ of the thickness of the hollow fiber porous membrane.

The hollow fiber porous membrane according to an embodiment of the present invention may have two void layers: the inner void layer and the outer void layer. In an embodiment of the present invention, the void layer may be a layer having a void with a diameter of 20 μm or greater. In an embodiment of the present invention, the void of 20 μm or greater may mean that the maximum diameter is 20 μm or greater and, for example, the major axis is 20 μm or greater in a void with an elliptic cross section.

The thickness of the inner void layer may be a thickness from $\frac{1}{5}$ to $\frac{3}{5}$ of the thickness of the hollow fiber porous membrane. The thickness of the outer void layer may be a thickness from $\frac{1}{5}$ to $\frac{3}{5}$ of the thickness of the hollow fiber porous membrane.

In an embodiment of the present invention, the interlayer may be a layer with a thin membrane thickness as a boundary between the inner void layer and the outer void layer. The thickness of the interlayer may be a thickness from $\frac{1}{100}$ to $\frac{1}{10}$ of the thickness of the hollow fiber porous membrane.

In an embodiment of the present invention, the outer surface dense layer may be a layer having no void with a pore diameter of 5 μm or greater. The thickness of the outer surface dense layer may be a thickness from $\frac{1}{10}$ to $\frac{3}{10}$ of that of the hollow fiber porous membrane.

The hollow fiber porous membrane according to one example of the present invention may contain a humectant in terms of adhesive sealing properties of the hollow fiber porous membrane during production of a hollow fiber membrane module according to an example of the present invention and in terms of appropriately performing an air leak inspection of the product in an as is state after production of the module. Examples of the humectant include one or more selected from glycerin, sodium lauryl sulfate, ethylene glycol, propylene glycol, and amyl alcohol, and, for example, the humectant may be glycerin in one example.

The content of the humectant may be 1 to 3 times the amount of a resin constituting the hollow fiber porous membrane in some examples and 1 to 2 times in some other examples in terms of adhesive sealing properties of the hollow fiber porous membrane during production of a medical hollow fiber membrane module according to an embodiment of the present invention and appropriately performing an air leak inspection of the product in an as is state after production of the module.

The humectant may be uniformly present in the outer surface dense layer and the inner surface dense layer of the hollow fiber porous membrane (the contents of the humectant in the outer surface dense layer and the inner surface dense layer may be different) in terms of adhesive sealing properties of the hollow fiber porous membrane during production of a hollow fiber membrane module according to an example of the present invention and appropriately performing an air leak inspection of the product in an as is state after production of the module.

Here, "the humectant is uniformly present in the outer surface dense layer and the inner surface dense layer of the hollow fiber porous membrane" means that a status where the outer surface dense layer and the inner surface dense layer are each entirely continuous as a white ring is observed in a cross-sectional image (a magnification of 50 times) of the hollow fiber porous membrane, for example, by X-ray CT.

In a swelling part (outer surface dense layer) of the hollow fiber porous membrane, pores on the surface are significantly denser than usual, and the humectant is less likely to penetrate. Thus, in the hollow fiber porous membrane having a swelling part, the white ring does not appear in an X-ray CT cross-sectional image. An increased number of swelling parts would cause difficulty in appropriately performing an air leak inspection of the product in an as is state after production of the hollow fiber membrane module according to an example.

In the hollow fiber porous membrane according to one example of the present invention, a bulging rate represented by a definition below may be less than 5%, in some examples less than 3%, in some other examples less than 2%, and in still some other examples less than 1% in further. Thus, the hollow fiber porous membrane according to an embodiment of the present invention can be obtained with a constant quality and is highly reliable.

Bulging Rate (%): for 20 or more of the hollow fiber porous membranes, after a membrane thickness in a cross section of each one of the hollow fiber porous membranes in the width direction is measured at randomly selected 10 or more locations, an average membrane thickness is calculated based on 200 or more locations in total, and the bulging rate is calculated by a formula below:

Bulging Rate (%)=(the number of locations where the membrane thickness as measured exceeded 1.3 times the average membrane thickness)/(the number of membrane thickness measurements)× 100

The bulging rate of the hollow fiber porous membrane can be calculated by cutting 20 or more hollow fiber porous membranes randomly at 10 locations, observing each cross section using a scanning electron microscope (SEM) (a magnification of approximately 50 times), and measuring the membrane thickness.

Method of Manufacturing Hollow Fiber Porous Membrane

An example of a method of manufacturing the hollow fiber porous membrane according to an embodiment of the present invention may include well-known spinning. For the spinning method performed in the spinning, a well-known spinning method, such as dry-wet spinning, dry spinning, or wet spinning, can be used, and the method may be, for example, a dry-wet spinning method or a wet spinning method.

A membrane-forming component may be polyethersulfone or polysulfone. According to one example, the membrane-forming component contains polyethersulfone (PES) or polysulfone (PSf), and in addition, polyacrylonitrile, polymethyl methacrylate, or the like can be used. In some examples, 80 mass % or greater, and in some other examples, 100 mass % may be polyethersulfone or polysulfone.

Examples of a solvent may include one or more selected from dimethyl sulfoxide (DMSO), dimethylformamide, dimethylacetamide, and N-methylpyrrolidone. For example, the solvent may be dimethyl sulfoxide among these.

Examples of a non-solvent may include one or more selected from polyethylene glycol, polypropylene glycol, and polyvinylpyrrolidone. For example, the solvent may be polyethylene glycol.

The concentration of the membrane-forming component (polymer component) in a membrane-forming solution composition may be from 10 to 30 mass %. The temperature of the membrane-forming solution composition during spinning may be from 50 to 65° C., for example, from 55 to 65° C. The temperature higher than 65° C. would excessively increase the bulging rate, and the temperature lower than 50° C. would excessively reduce the water permeation performance of the hollow fiber porous membrane.

In spinning from a nozzle, for example, a mixed solution of water and polyethylene glycol may be used as an internal coagulation liquid. The internal coagulation liquid may contain from 40 to 60 mass % of water and from 40 to 60 mass % of polyethylene glycol. The temperature of the internal coagulation liquid may be the same as or lower than the temperature of the membrane-forming solution composition.

In applying dry-wet spinning, for example, after ejected from a spinning nozzle, the hollow fiber porous membrane is driven in air, introduced into an external coagulation liquid to coagulate, and then can be washed with water and dried. In terms of reducing the bulging rate described above, the ejection direction of the ejection port of the spinning nozzle can be ejected substantially vertically to the horizontal plane in a coagulation tank containing the external coagulation liquid. More specifically, the spinning nozzle ejecting the hollow fiber porous membrane may adjust the ejection direction of the spinning nozzle, for example, to a maximum angle of 0 to 2 degrees, and in some examples, 0 to 1.5 degrees to a vertical line connecting the ejection port of the spinning nozzle and the horizontal plane of the coagulation tank. In applying wet spinning, after spinning, the hollow fiber porous membrane is introduced into an external coagulation liquid to coagulate, and then can be washed with water and dried.

According to one example of the present invention, the method of manufacturing the hollow fiber porous membrane may include immersing the hollow fiber porous membrane after spinning in water containing a humectant. The immersing may be to allow a humectant to penetrate the hollow fiber porous membrane to give a content of the humectant from 1 to 3 times the amount of a resin constituting the hollow fiber porous membrane in some examples and from 1 to 2 times in some other examples in terms of adhesive sealing properties of the hollow fiber porous membrane during production of a hollow fiber membrane module according to an embodiment of the present invention and appropriately performing an air leak inspection of the product in an as is state after production of the module. The hollow fiber porous membrane is immersed, then dried with hot air, and then can be stored in a dry state.

Hollow Fiber Membrane Module

A hollow fiber membrane module according to an embodiment of the present invention may be a hollow fiber membrane module including a case housing and a hollow fiber membrane bundle housed in the case housing, the hollow fiber membrane bundle being formed by bundling from several hundreds to several thousands of hollow fiber porous membranes, and a resin (such as a polyurethane resin) sealing the hollow fiber membrane bundle in at least one end of the case housing. The hollow fiber membrane module according to an embodiment of the present invention may be used as a medical hollow fiber membrane module and may be used, for example, for an endotoxin capture filter.

According to one example of the present invention, the structure of the hollow fiber membrane module itself may be a well-known structure and can be a structure, for example, as illustrated in FIGS. 1 to 5 of JP 2004-089800 A.

EXAMPLES (1) Membrane Structure (Method of Observing Hollow Fiber Membrane Cross Section)

A hollow fiber porous membrane was cut in the width direction, and a scanning electron microscope (SEM) photograph of the cross section was taken at a magnification of 200 to 300 times. The average pore diameter of 50 neighboring pores in each layer was determined using analytical software.

(2) Measurement of Molecular Weight Cut-Off

Molecular weight cut-off was measured by dissolving insulin (molecular weight 5800) to give a concentration of 250 mg/L in a buffer solution containing sodium phosphate (0.05 M) and sodium chloride (0.1 M), and adjusting a pH to 6, and passing this solution inside the hollow fiber porous membrane to filter this solution at an inter-membrane pressure of 0.1 MPa, and determining the concentration of the insulin in the permeate after 30 minutes of filtration using an absorption spectrometer (a wavelength of 277 nm) and determining the blocking rate of the insulin. When the measured blocking rate of the hollow fiber porous membrane was 90% or greater, the molecular weight cut-off of the hollow fiber porous membrane was determined to be 6000.

(3) Measurement of Bulging Rate

From produced hollow fiber porous membranes, 20 or more hollow fiber porous membranes were randomly taken, each one of the hollow fiber porous membranes was cut in the width direction randomly at 10 or more locations, a membrane thickness of the cross section was measured using a scanning electron microscope (SEM) (a magnification of 50 times), and the bulging rate (%) defined below was calculated.

Bulging Rate (%): for 20 or more of the hollow fiber porous membranes, after a membrane thickness in a cross section of each one of the hollow fiber porous membranes in the width direction is measured at randomly selected 10 or more locations, an average membrane thickness is calculated based on 200 or more locations in total, and the bulging rate is calculated by a formula below:

$$\text{Bulging Rate (\%)} = \frac{\text{(the number of locations where the membrane thickness as measured exceeded 1.3 times the average membrane thickness)}}{\text{(the number of membrane thickness measurements)}} \times 100$$

(4) Air Leak Inspection

The present inventors investigated physical properties of the hollow fiber membrane suitable for use in the hollow fiber membrane module. Hollow fiber membrane modules are typically checked for a defect of the hollow fiber membrane or the module at the final stage of production. Thus, typically employed is an inspection method in which the inside or outside of the hollow fiber membrane is pressure-sealed with air and allowed to stand in this state for a certain period of time, and then the amount of change in this pressure is measured to detect the leakage. If there is no air leakage from the hollow fiber membrane pores, the pressure inside the hollow fiber membrane is kept constant, but when a leak is detected with pressurized air, the pressure decreases over time. The greater the amount of this change, the greater the degree of air leak. The magnitude of the air pressure applied to the hollow fiber membrane module for inspection is typically several times the guaranteed withstand pressure of a hemodialyzer (usually 0.067 MPa) and may be appropriately determined according to the level of safety required for the module. In an example of the present invention, an air pressure of 0.15 MPa was applied, and the reliability of the hollow fiber membrane module was determined by the level of pressure drop 15 seconds after stopping the air supply.

(5) Observation of Penetration Status of Humectant

From a produced hollow fiber membrane module, 234 hollow fiber porous membranes in the C portion corresponding to the upper right portion of the module with the coupler placed in the upper side as illustrated in FIG. 1(a) were extracted and combined into one bundle. The hollow fiber membrane bundle was cut at seven positions of 1 to 7 illustrated in FIG. 1(b), and cross section of the hollow fiber porous membrane were photographed by X-ray CT (a magnification of approximately 50 times). The penetration status of a humectant was observed from the cross-sectional images of 1638 locations obtained from the hollow fiber porous membranes.

Example 1

Membrane-Forming Solution Composition

To a solvent containing 60 mass % of dimethyl sulfoxide (DMSO) and 20 mass % of polyethylene glycol (PEG; MW 200), 20 mass % of polyethersulfone (PES) was added and dissolved by heating at 80° C. for about three hours, and a membrane-forming solution composition was obtained.

Manufacturing of Hollow Fiber Porous Membrane

The membrane-forming solution composition described above was defoamed under reduced pressure over 3 hours. The defoamed membrane-forming solution composition was used and spun at 60° C. with a double spinning nozzle. A mixture of 45 mass % of water and 55 mass % of polyethylene glycol was used as the internal coagulation liquid.

After ejected from the double spinning nozzle, a hollow fiber porous membrane was passed through a drying space of a distance of 200 mm to dry and passed through a coagulation tank containing warm water. At this time, in terms of reducing the bulging rate described above, the ejection direction of the ejection port of the double spinning nozzle was ejected substantially vertically to the horizontal plane in the coagulation tank containing water. In Example 1, the ejection direction of the ejection port of the double spinning nozzle was adjusted to eject at a maximum angle of 1.2 degrees to a vertical line connecting the ejection port of the double spinning nozzle and the horizontal plane of the coagulation tank. Thereafter, the hollow fiber porous membrane was further passed through a water washing tank and a glycerin tank and wound. Each measurement described above was performed on the resulting hollow fiber porous membrane.

Figure 2:
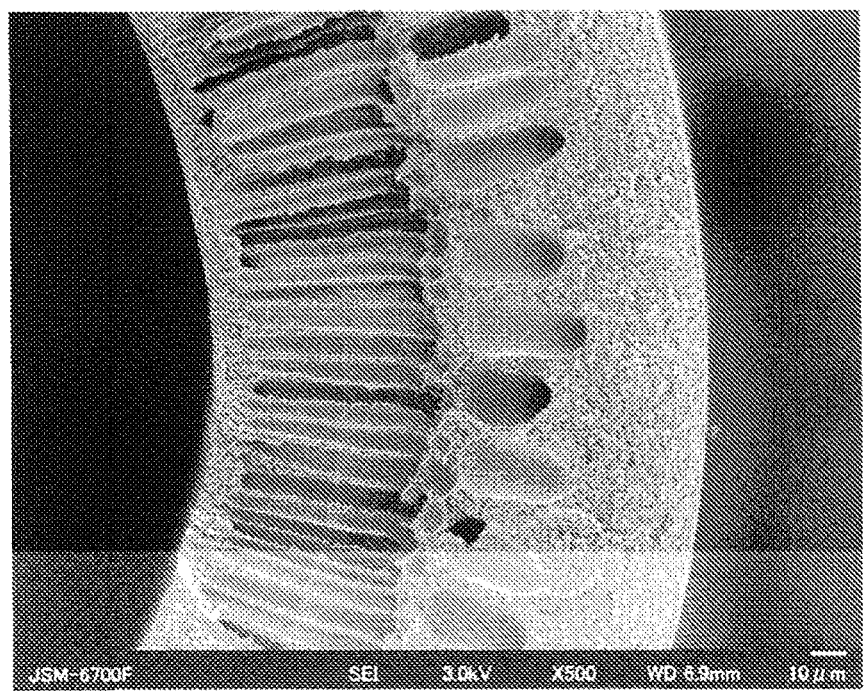
FIG. 2 is an SEM photograph illustrating a cross-sectional structure of a hollow fiber porous membrane of Example 1.

The cross-sectional structure of the resulting hollow fiber porous membrane was observed with the SEM described in (1) above. An SEM photograph is illustrated in FIG. 2. From the SEM photograph of FIG. 2, the cross-sectional structure of the resulting hollow fiber porous membrane was found to include a five-layer structure of an inner surface dense layer, an inner void layer, an interlayer, an outer void layer, and an outer surface dense layer, from the average pore diameter and the presence or absence of a void with a diameter of 20 µm or greater. The resulting hollow fiber porous membrane had an inner diameter of 500 µm and a thickness of 150 µm. The inner surface dense layer was a layer having no void with a pore diameter of 5 µm or greater and had an average pore diameter of 0.02 µm and a thickness of 15 µm. The thickness of the inner void layer was 55 µm, the thickness of the interlayer was 10 µm, the thickness of the outer void layer was 35 µm, and each void layer was a layer having pores of 20 µm or greater. The outer surface dense layer was a layer having no void with a pore diameter of 5 µm or greater and had an average pore diameter of 0.07 µm and a thickness of 35 µm.

Figure 3:
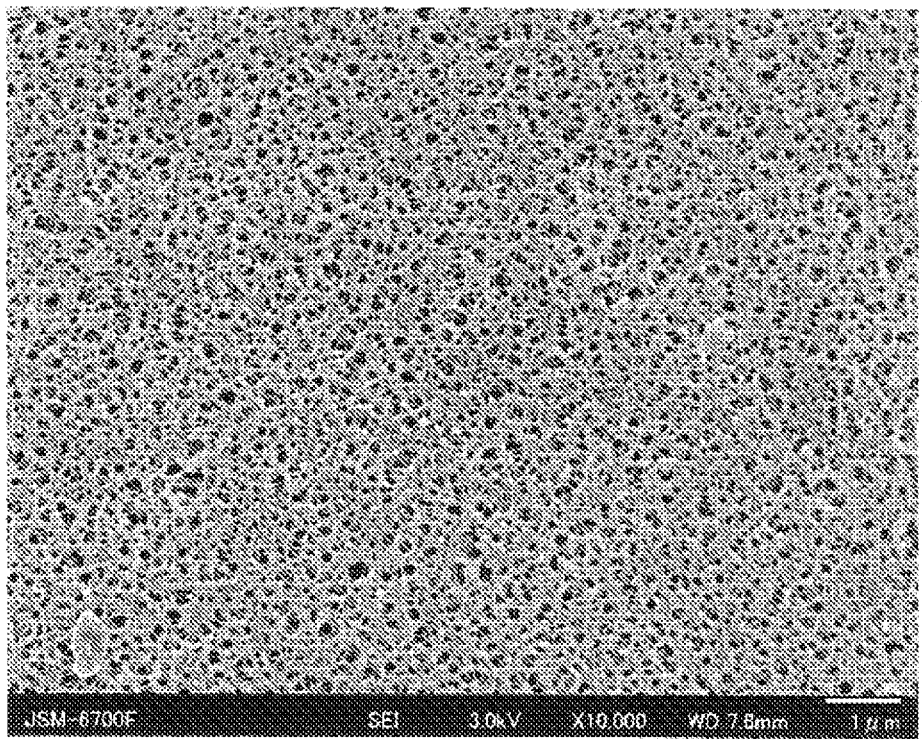
FIG. 3 is an SEM photograph illustrating an outer surface of a hollow fiber porous membrane of Example 1.

In addition, in observation of the inner surface of the hollow fiber porous membrane (the inner surface in the vertical direction to the membrane cross section in FIG. 2) with an SEM photograph (a magnification of 10000 times), pores were not observed, and thus the pore diameter of the pores on the inner surface can be estimated to be less than 0.01 µm. Furthermore, the average pore diameter of the pores on the outer surface of the hollow fiber porous membrane (the outer surface in the vertical direction to the membrane cross section in FIG. 2) was 0.1 µm. Moreover, a plurality of pores with a pore diameter from 0.1 to 0.5 µm was present throughout the outer surface of the resulting hollow fiber porous membrane. From 3 to 10 pores were present per an area of 2 µm² in any locations around the outer surface. An SEM photograph (a magnification of 10000 times) of the outer surface of the hollow fiber porous membrane obtained in Example 1 is illustrated in FIG. 3. Still more, the blocking rate of insulin measured by the method described in (2) above for the hollow fiber porous membrane obtained in Example 1 was 90%, and the molecular weight cut-off was 6000.

Comparative Example 1

A hollow fiber porous membrane was obtained under the same conditions as in Example 1 with the exception that the temperature of the double spinning nozzle was set at 70° C., and the ejection direction of the double spinning nozzle was adjusted to eject at a maximum angle of 2.3 degrees to a vertical line connecting the ejection port of the double spinning nozzle and the horizontal plane of the coagulation tank in Example 1 above.

Observation of the cross-sectional structure of the resulting hollow fiber porous membrane with the SEM described in (1) above revealed a five-layer structure of an inner surface dense layer, an inner void layer, an interlayer, an outer void layer, and an outer surface dense layer as in Example 1. The resulting hollow fiber porous membrane had an inner diameter of 500 µm and a thickness of 150 µm. The inner surface dense layer was a layer having no void with a pore diameter of 5 µm or greater and had an average pore diameter of 0.02 µm and a thickness of 10 µm. The thickness of the inner void layer was 50 µm, the thickness of the interlayer was 10 µm, the thickness of the outer void layer was 40 µm, and each void layer was a layer having pores of 20 µm or greater. The outer surface dense layer was a layer having no void with a pore diameter of 5 µm or greater and had an average pore diameter of 0.07 µm and a thickness of 40 µm. However, at locations with an increased membrane thickness in the cross section, the thickness of the outer void layer was 70 µm, and the thickness of the outer surface dense layer was 10 µm.

Figure 4:
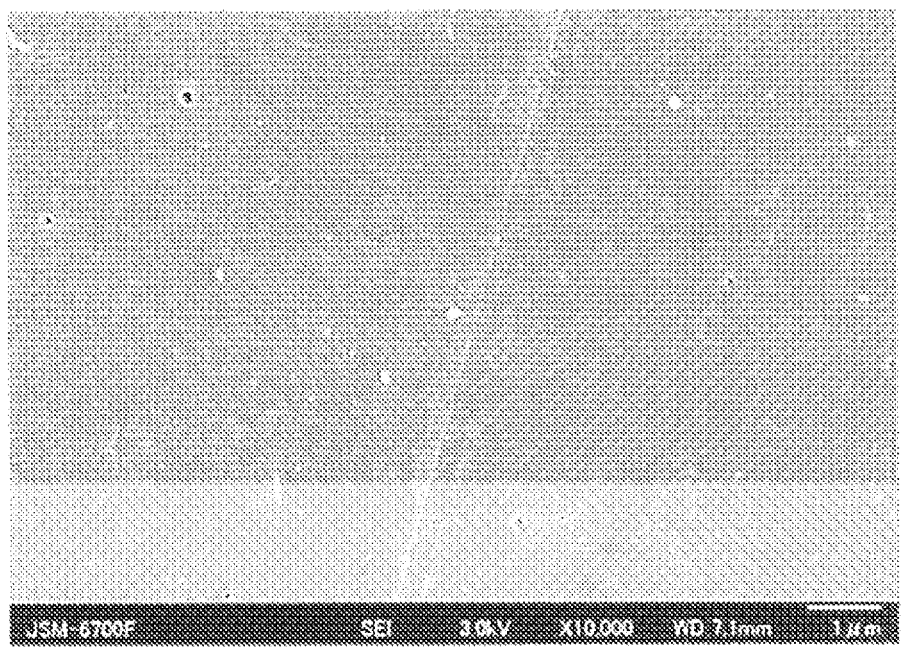
FIG. 4 is an SEM photograph illustrating an outer surface of a hollow fiber porous membrane of Comparative Example 1.

In addition, in observation of the inner surface of the hollow fiber porous membrane (the inner surface in the vertical direction to the membrane cross section in FIG. 2) with an SEM photograph (a magnification of 10000 times), pores were not observed, and thus the pore diameter of the pores on the inner surface can be estimated to be less than 0.01 µm. Furthermore, on the outer surface of the hollow fiber porous membrane, there were locations where pores with a pore diameter from 0.1 to 0.5 µm were observed on the outer surface and locations where pores were not observed (locations with an increased membrane thickness in the cross section), and pores were non-uniformly open around the outer surface. That is, as illustrated in FIG. 4, locations with no pores per an area of 2 µm² were observed around the outer surface. Still more, the molecular weight cut-off measured by the method described in (2) above for the hollow fiber porous membrane obtained in Comparative Example 1 was 6000.

For the hollow fiber porous membranes obtained in Example 1 and Comparative Example 1, the bulging rate of (3) described above was measured using a scanning electron microscope (SEM). The bulging rate of the hollow fiber porous membrane of Example 1 was 0%, while the bulging rate of the hollow fiber porous membrane of Comparative Example 1 was 5.4%.

The hollow fiber porous membranes obtained in Example 1 and Comparative Example 1 were immersed in a humectant of a 45 mass % aqueous glycerin solution. The content of glycerin in each resulting hollow fiber porous membrane was twice the amount of the resins constituting the hollow fiber porous membrane.

After immersion in glycerin, the hollow fiber porous membranes were dried in a dryer at 55° C. for two hours, then each was bundled and housed in a case housing illustrated in FIG. 1, and each measurement described in (4) and (5) above was performed.

In the air leak inspection of (4) described above, the hollow fiber porous membrane of Example 1 had a smaller amount of change in air leak than the hollow fiber porous membrane of Comparative Example 1.

Figure 5:
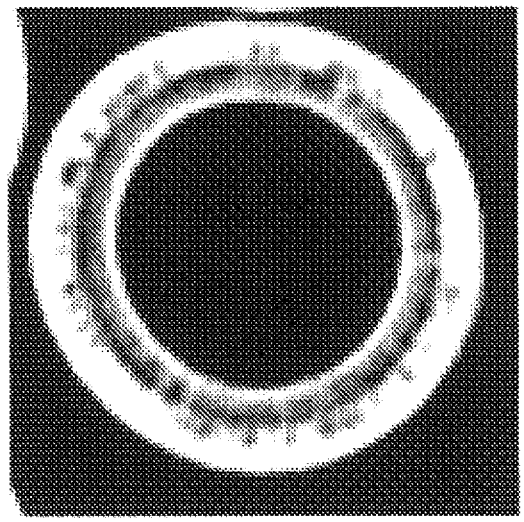
FIG. 5 is an X-ray CT image illustrating a cross-sectional structure in a state where glycerin is penetrated into a hollow fiber porous membrane of Example 1.

In addition, in a cross-sectional image of the hollow fiber porous membrane of Example 1 taken by the X-ray CT described in (5) above, the outer surface dense layer and the inner surface dense layer were each entirely continuous as a white ring, revealing that glycerin was uniformly present in each of the outer surface dense layer and the inner surface dense layer of the hollow fiber porous membrane. On the other hand, in the hollow fiber porous membrane of Comparative Example 1, many locations not entirely continuous as a white ring were observed in the outer surface dense layer, revealing that the hollow fiber porous membrane had many locations where glycerin was not uniformly present in the outer surface dense layer. One of the cross-sectional images of the hollow fiber porous membrane of Example 1 by X-ray CT is illustrated in FIG. 5 and Comparative Example 1 in FIG. 6.

Figure 6:
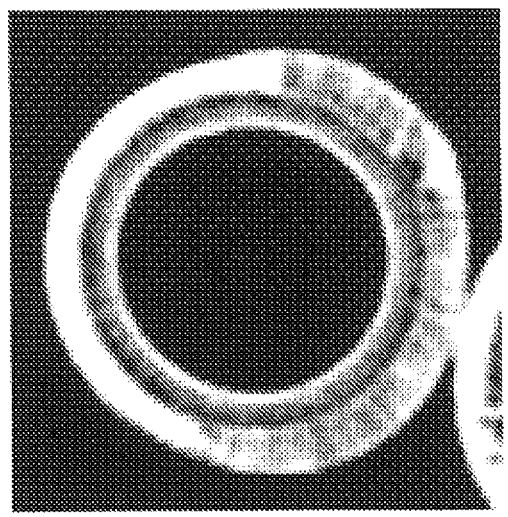
FIG. 6 is an X-ray CT image illustrating a cross-sectional structure of a swelling part in a state where glycerin is penetrated into a hollow fiber porous membrane of Comparative Example 1.

In some of the hollow fiber porous membranes of Comparative Example 1, a swelling part in the cross section of the hollow fiber porous membrane after immersion in glycerin (swelling part) was observed by taking a cross-sectional image of the hollow fiber porous membrane by the X-ray CT of (5) described above, and this revealed that the white ring of the outer surface dense layer was interrupted. One of the images of the cross section in the swelling part of the hollow fiber porous membrane of Comparative Example 1 taken by X-ray CT is illustrated in FIG. 6.

The hollow fiber porous membrane of Example 1 has a small bulging rate, and glycerin as a humectant is uniformly present in each of the inner surface dense layer and the outer surface dense layer of the hollow fiber membrane and can penetrate the pores of each layer. Thus, air leak is thought to be less likely to occur.

On the other hand, Comparative Example 1 has a higher bulging rate than Example 1, that is, many swelling parts are present. In the swelling part, pores on the surface are significantly denser than usual, and thus glycerin is less likely to penetrate. As is clear from FIG. 6, in the swelling part, glycerin is not uniformly present at least in the outer surface dense layer. This is thought to have increased the air leak due to the swelling part and to have increased the amount of change in the air leak.

INDUSTRIAL APPLICABILITY

The hollow fiber porous membrane according to an embodiment of the present invention and the hollow fiber membrane module produced using the hollow fiber membrane have a low risk of leaking and are highly reliable, and thus can be used for an endotoxin capture filter or the like.

The invention claimed is:

1. A hollow fiber porous membrane comprising polyethersulfone or polysulfone, wherein
the hollow fiber porous membrane has an inner diameter from 300 to 600 μm and a thickness from 70 to 200 μm;
the hollow fiber porous membrane has a molecular weight cut-off of 10000 or lower;
the hollow fiber porous membrane has a plurality of pores having a pore diameter from 0.1 to 0.5 μm throughout an outer surface of the hollow fiber porous membrane; and
the hollow fiber porous membrane has a bulging rate of less than 5%, the bulging rate being defined below:
Bulging Rate (%): for 20 or more hollow fiber porous membranes, after a membrane thickness in a cross section of each one of the hollow fiber porous membranes in a width direction is measured at randomly selected 10 or more locations, an average membrane thickness is calculated based on 200 or more locations in total, and the bulging rate is calculated by a formula below:

Bulging Rate (%)=(location numbers where the membrane thickness as measured exceeded 1.3 times the average membrane thickness)/(membrane thickness measurement numbers)×100;

wherein the bulging rate is calculated by cutting the 20 or more hollow fiber porous membranes randomly at 10 locations, observing each cross section using a scanning electron microscope, and measuring the membrane thickness;
wherein the hollow fiber porous membrane has a five-layer structure comprising sequentially from inside to outside an inner surface dense layer, an inner void layer, an interlayer, an outer void layer, and an outer surface dense layer;
wherein the hollow fiber porous membrane contains a humectant, the humectant being uniformly present in the outer surface dense layer and the inner surface dense layer.

2. The hollow fiber porous membrane according to claim 1, wherein the humectant is glycerin.

3. The hollow fiber porous membrane according to claim 1, wherein the hollow fiber porous membrane is for an endotoxin capture filter.

4. A hollow fiber membrane module comprising a case housing and a hollow fiber membrane bundle housed in the case housing, the hollow fiber membrane bundle being formed by bundling the hollow fiber porous membrane described in claim 1.

5. The hollow fiber membrane module according to claim 4, wherein the hollow fiber membrane module is for medical use.

6. The hollow fiber porous membrane according to claim 2, wherein the hollow fiber porous membrane is for an endotoxin capture filter.

7. A hollow fiber membrane module comprising a case housing and a hollow fiber membrane bundle housed in the case housing, the hollow fiber membrane bundle being formed by bundling the hollow fiber porous membrane described in claim 3.

8. A hollow fiber membrane module comprising a case housing and a hollow fiber membrane bundle housed in the case housing, the hollow fiber membrane bundle being formed by bundling the hollow fiber porous membrane described in claim 6.

9. A hollow fiber membrane module comprising a case housing and a hollow fiber membrane bundle housed in the case housing, the hollow fiber membrane bundle being formed by bundling the hollow fiber porous membrane described in claim 2.

\* \* \* \* \*